United States Patent
Schuster

[11] 3,784,822
[45] Jan. 8, 1974

[54] RADIOACTIVITY WELL LOGGING METHODS AND APPARATUS

[75] Inventor: Nick A. Schuster, Darien, Conn.

[73] Assignee: Schlumberger Technology Corporation, New York, N.Y.

[22] Filed: July 13, 1971

[21] Appl. No.: 162,068

[52] U.S. Cl............................250/260, 250/269
[51] Int. Cl............................................. G01v 5/00
[58] Field of Search...................... 250/83.1, 83.6 W

[56] References Cited
UNITED STATES PATENTS

| | | | |
|---|---|---|---|
| 3,462,600 | 8/1969 | Dewan | 250/83.1 |
| 3,509,343 | 4/1970 | Locke | 250/83.1 |
| 3,453,433 | 7/1969 | Alger et al. | 250/83.1 X |
| 3,566,117 | 2/1971 | Tixier | 250/83.1 |

*Primary Examiner*—Archie R. Borchelt
*Attorney*—William R. Sherman, Stewart F. Moore, Jerry M. Presson, Edward M. Roney, Ernest R. Archambeau, David L. Moseley, Michael J. Berger and James C. Kesterson

[57] ABSTRACT

An illustrative embodiment of the invention compensates neutron measurements of the porosity of an earth formation for sudden changes in borehole diameter. Typically, a sidewall porosity logging tool for transport through a borehole is equipped with two neutron detectors spaced at different distances from the neutron source. In order to improve the vertical resolution of the tool, a circuit stores the signal from the longspaced detector until the shorter spaced detector has traversed a distance along the borehole wall that is equal to the separation between the two detectors. This memory feature adjusts the porosity signals to a common zone of observation. These apparent porosity signals then are combined with borehole caliper signals to compensate for the effect of changes in borehole diameter.

8 Claims, 3 Drawing Figures

INVENTOR.
Nick A. Schuster

BY

ATTORNEY

RADIOACTIVITY WELL LOGGING METHODS AND APPARATUS

BACKGROUND OF THE INVENTION

1. Field of the Invention

The invention relates to techniques for measuring earth formation characteristics and, more particularly, to a technique for compensating a high-resolution neutron porosity well logging tool for sudden changes in borehole diameter, and the like.

2. Description of the Prior Art

Knowledge regarding the porosity of an earth formation traversed by a borehole is of fundamental importance in oil and natural gas exploration. Specifically, because a producible formation can be neglected or evaluated improperly if porosity information is wrong or misleading, logging techniques for accurately measuring this quantity are extremely valuable. Amon the different types of equipment that are used to measure this characteristic are logging tools, or sondes, that contain a source of neutrons and a radiation detector spaced from the source for movement through the borehole.

The radiation pattern registered by the detector as it traverses the borehole provides some indication of the formation porosity. Porosity indications of this sort, however, occasionally are in error. For example, if the formation comprises thin interbedded layers of limestone and ordinary salt, the water in the circulating drilling mud or other liquids that often fill the borehole dissolve the salt between the adjacent limestones. These "washouts," or uncontrolled local increases in the borehole diameter beyond that established initially by the size of the drill bit, disturb the neutron distribution registered by the detector. Consequently, the logging tool presents data that does not reflectt the formation porosity, but indicates a somewhat erroneous apparent value that departs from the actual condition.

Thus, it is an object of the invention to provide a means for adjusting the signals from a neutron porosity logging tool for changes in borehole size.

It is still another object of the invention to provide a technique for indicating more nearly the true porosity of an earth formation without regard to the character of the borehole wall.

It is a further object of the invention to improve the vertical resolution of a neutron porosity logging tool in spite of borehole size changes.

SUMMARY

An illustrative embodiment of the invention is applicable to a high resolution neutron porosity logging system of the sort described in U.S. Pat. application Ser. No. 570,068 filed Aug. 3, 1966 by Stanley Locke, Harold Sherman and John S. Wahl for "Measuring Apparatus and Method," now U.S. Pat. No. 3,483,376 issued Dec. 9, 1969 and assigned to the assignee of the present invention.

As described in more complete detail in the aforementioned Locke et al patent application, an exemplary neutron porosity logging tool comprises a neutron source and a short-spaced neutron detector, the effective center of which is positioned within the tool about 9 inches from the source. The effective center of a second, and long-spaced neutron detector, is located about 17 inches from the source. A reasonably accurate indication of formation porosity is established by combining the signals from these two detectors.

In order to establish a good physical contact between the sonde and the formation, the logging tool can be urged against the borehole wall by an apparatus of the type described more completely in D. F. Saurenman U.S. Pat. No. 3,254,211, granted on May 31, 1966 for "Articulated Gamma-Gamma Borehole Logging Apparatus" and assigned to the assignee of the invention described herein.

Because a separation between the detector centers is essential to the operation of the Locke et al porosity tool, the observed porosity apparently cannot be resolved as a function of borehole depth within, for example, less than about 8 inches, which is the separation between the effective detector centers.

This depth ambiguity is reduced, however, in accordance with one aspect of the invention that enables the signal from at least one of the detectors to be "memorized" or stored until the tool has been drawn along the borehole wall a distance equal to the separation between the detector centers or some other point of reference. The stored signal and the signal received from the other detector then are combined to produce a porosity related output signal. This output signal corresponds to the same datum or reference level in the formation rather than to a porosity value averaged over the inter-detector separation. Thus, this output provides a higher degree of vertical resolution than that which heretofore has been possible.

Gradual changes in borehole diameter, as well as the more abrupt changes produced by Local washouts and caving, cause the neutron diffusion pattern observed through these detectors to depart from the actual neutron spatial distribution within the formation. This difference between the actual, or formation neutron distribution pattern, and the neutron distribution pattern observed from the borehole naturally leads to some error in the porosity measurement. For example, in a limestone formation, a 2-inch change in borehole diameter has been found to cause deviations of four porosity units between the actual and the observed values.

Illustratively, sudden changes in the borehole diameter that occur when the vertical extent of the cave is less than the length of the tool are typical of washout conditions. In response to these washouts, the tool will tilt on entering the cave, bridge across the mid-portion, and tilt once more on leaving. In this situation, the contact between the formation and the adjacent detectors not only is poor in general, but also varies considerably in quality. For instance, the long-spaced detector enjoys a relatively good contact when tilting into the cave and a bad contact when bringing the cave as the tool is drawn upward through the borhole. The changing nature of this contact with the borehole wall is responsible, at least in part, for the manner in which the detector signals depart from the neutron distribution as it actually exists within the formation.

When the vertical resolution of the tool is improved through the aforementioned signal storage technique, however, these typical disturbances in the contact between the detector and the formation produce greater corresponding errors in the apparent porosity. For example, with an 8-inch or more minimum vertical separation between the detector centers, the apparent porosity registered by each detector seems to be averaged over the entire resolving distance. This averaging effect tends to depress the influence of these tilting and bridging discontinuities in the observed radiation pattern. The desired reduction in the vertical resolution distance, however, tends to decrease the averaging basis and produce detector signals that are sensitive to local borehole distortions. Accordingly, these high resolution tool signals seem to be subject to a greater apparent porosity variation in response to a given borehole size change than the signals that characterize tools of inferior vertical resolution.

A further aspect of the invention overcomes this problem. By measuring the size of the borehole adjacent to a point of reference, as for example, the center of one of the detectors, a "caliper" signal is produced that indicates the extent of the change in the borehole diameter. A further circuit combines this caliper signal with the apparent porosity signal to compensate for the change in borehole size according to a predetermined relation.

Thus, a multiple detector neutron logging tool in combination with signal memorizing means provides a better vertical porosity resolution than that which heretofore has been available. The greater sensitivity of this tool to borehole diameter changes, however, is overcome through an automatic caliper correction that adjusts the apparent formation porosity signal to a more nearly correct value.

For a better understanding of the present invention, together with other and further objects thereof, reference is had to the following description taken in connection with the accompanying drawing, the scope of the invention being pointed out in the appended claims.

DESCRIPTION OF THE PREFERRED EMBODIMENTS

Figure 1:
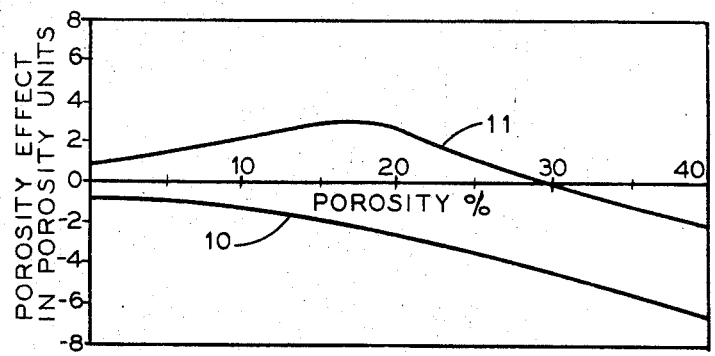
FIG. 1 is a graph of porosity effect as a function of the apparent porosity of a limestone formation as observed from within a borehole of changing diameter.

The curve 10 shown in FIG. 1 demonstrates that the apparent porosity registered by a properly calibrated neutron logging tool in, for example, a limestone formation traversed by a borehole that decreases in diameter from 8 to 6 inches may depart from the actual formation porosity by as much as a negative seven porosity units. As the borehole size increases from 8 to 10 inches, however, a curve 11 indicates that the actual (or true) formation porosity may be as much as four porosity units greater than the observed (or apparent) porosity. It also should be noted that the curves 10 and 11 are nonlinear and do not appear to display a common pattern or unifying feature of the sort that might lead to the development of a more general physical theory.

Figure 2:
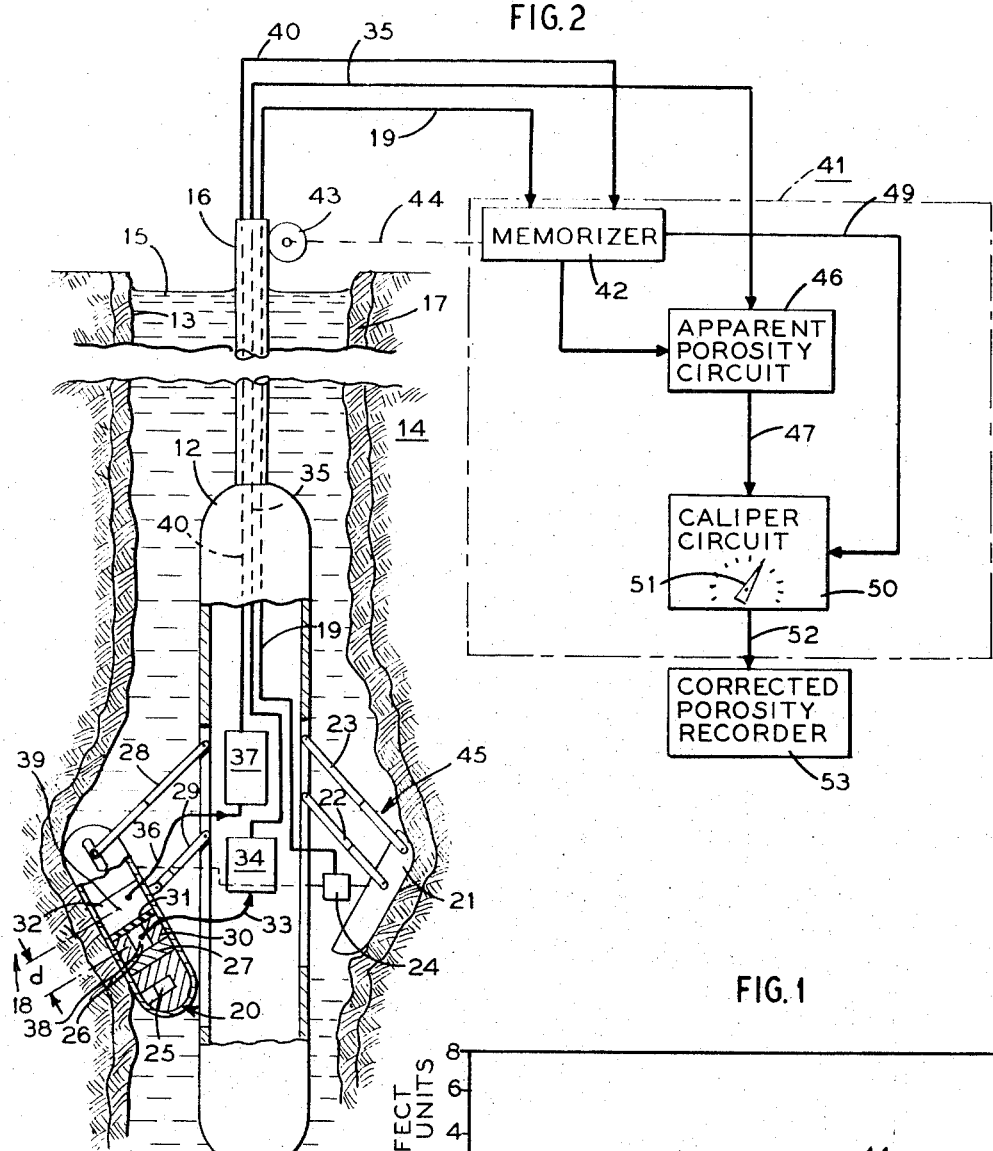
FIG. 2 is a schematic diagram of a typical embodiment of the invention in partial section showing the circuits associated therewith in block diagram form.

Turning now to FIG. 2, an illustrative embodiment is shown of a practical apparatus for accurately identifying formation porosity in accordance with the principles of the invention.

The tool comprises a fluid-tight pressure resistant housing 12 adapted to pass through a borehole 13 that traverses earth formations 14. The borehole 13 may be dry or may be filled with water-base or oil-base drilling mud 15 as shown. The housing 12 is suspended in the borehole 13 by an armored cable 16 which may contain a group of insulated conductors for transmitting signals to the earth's surface. A winch (not shown) located at the surface of the earth is used to lower and raise the housing in the borehole in the customary manner to traverse the earth formations 14.

The borehole 13 may be lined with a mudcake 17 which usually forms in uncased boreholes when the liquids in the drilling mud invade or seep into the earth formations 14 surrounding the borehole 13 and deposit a residue of solid matter on the borehole walls.

An articulated logging tool suitable for use with the invention is described in more complete detail in the aforementioned Saurenman patent. For the purpose of illustration, however, the force required to press the working surface of a skid 20 against the formation 14 is applied by a backup shoe 21 that is attached to a pair of spring biased telescopic decentralizing arms 22 and 23. These arms, and a similar set of arms 28 and 29 associated with the skid 20, are connected to the housing 12 and pivot in the plane of the drawing. The arms exert a radially directed force that urges the skid 20 against the formation 14. The housing 12, the skid 20, and the backup shoe 21, moreover, are combined with a borehole caliper or measuring device 24, such as potentiometer, in order to transmit signals to the earth's surface through a conductor 19 in the armored cable 16 that are indicative of variations in borehole diameter.

In the lower end of the skid 20 a neutron source 25 of about 20 curies activity irradiates the formation 14. Typically, the source 25 may comprise an intimate mixture of plutonium and beryllium or americium and beryllium that emits fast neutrons, although other neutron sources also may be used, as for example, radium-beryllium mixtures and electrical neutron generators.

A neutron detector 26 is axially spaced about nine inches from the geometric center of the source 25 by a neutron shield 27 of boron carbide or the like. Preferably, the detector 26 is of the type that comprises a hollow cylindrical cathode surrounding a centrally disposed anode wire (not shown). The volume between thse electrodes is filled with gaseous $He^3$ (helium 3) at a pressure of four atmospheres. Irradiating neutrons from the source 25 that are scattered back to the skid 20 by the formation 14 collide with the $He^3$ atoms in the gas and initiate nuclear reactions. Each reaction causes some filling gas ionization which produces an electrical charge pulse in the electrodes that is representative of the reaction energy. The detector 26, for example, may be 7-¼ inches in length and 1-¾ inches in diameter such that the transverse area of the detector 26 is substantially less than the corresponding transverse area of the skid 20. The annulus formed between the detector 26 and the interior surface of the skid 20 is occupied by a sleeve 30 of aluminum, or some similar material that is transparent to neutrons.

Because the detector 26 occupies a significant portion of the volume of the skid 20, points of reference usually are established in order to measure separation between the source 25 and the detector 26. For example, the American Petroleum Institute defines neutron source spacing as the distance in inches from the center of activity of the neutron source to the nearest end of ities that otherwise would have been reduced in apparent effect through the averaging process inherent in the spacing of the detectors and the source. Consequently, the superior vertical resolution provided by the memorizer 42 results in signals that are subject to a greater range of fluctuations in response to local irregularities than more broadly averaged tools of inferior vertical resolution.

In accordance with another aspect of the invention, this increased signal response to local disturbances that attends the improved resolution is overcome by the signal from the borehole caliper 24 in the conductor 19. The borehole size or diameter signal in the conductor 19 is stored by the memorizer 42 until the skid 20 has been drawn upward in the borehole through the distance $d$. Because the caliper 24 is diametrically opposite to the long-spaced detector 32, the caliper signal also is memorized in order to correspond to the predetermined reference point on the skid 20. As an alternative example, the caliper 24 can be positioned opposite to the short-spaced detector 26 and the signal transmitted up the borehole for processing without memorization.

Figure 3:
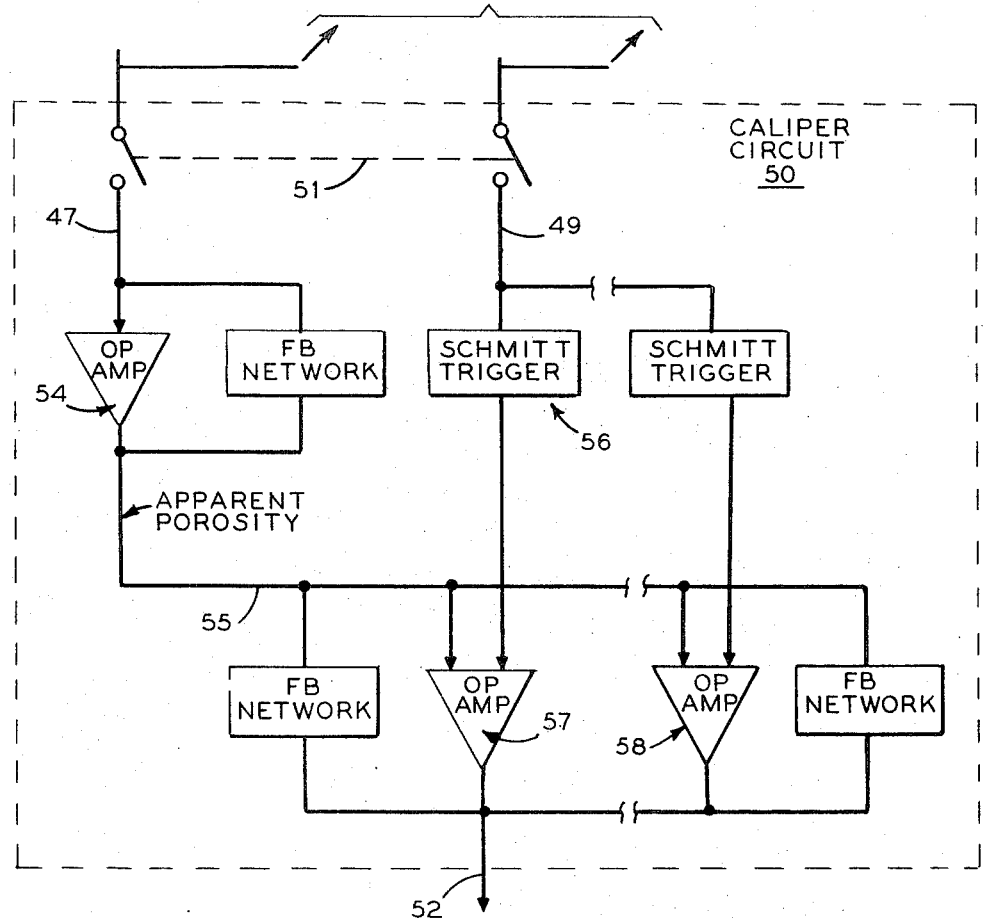
FIG. 3 is a schematic diagram of an illustrative function former circuit for use in the embodiment of the invention shown in FIG. 2.

The apparent porosity ratio signal from the circuit 46, applied to the conductor 47, and the memorized caliper signal in a conductor 49 are combined in a caliper circuit 50 in accordance, for example, with the illustrative graph in FIG. 1 to produce a more accurate indication of formation porosity. Typically, a circuit for applying this borehole size correction is shown in FIG. 3. A set of function former circuits each of which is individual to a specific mineral composition, such as sandstone or limestone, is selectivley applied to the caliper and apparent porosity ratio signals in the conductors 47 and 49 by a switch 51.

Thus, the apparent porosity signal in the conductor 47 (FIG. 3) is connected through an operated contact of the matrix selection switch 51 to a function former circuit 54 that comprises an operational amplifier and a resistor-diode feedback network. This function former circuit applies a signal to the conductor 55 that is related to an apparent formation porosity value. At the same time, the caliper signal in the conductor 49 is applied through another operated contact in the switch 51 to a peak detection circuit 56 that is shown for illustrative purposes as a parallel array of Schmitt trigger circuits. According to the amplitude of the signal on the conductor 49, one or more of the Schmitt trigger circuits are turned on to energize respectively associated function former circuits 57 and 58. These circuits also are coupled to the apparent porosity conductor 55. These circuits 57 and 58 apply the porosity effect correction to the apparent porosity input signal in the conductor 55 that is appropriate to the specific change in borehole diameter registered by the caliper 24 (FIG. 2). As the borehole size increases and decreases the number of energized Schmitt trigger circuits also increases and decreases to approximate the function shown in FIG. 1. A borehole size corrected formation porosity signal thus is coupled by an output conductor 52 to a corrected porosity record 53 which preferably may produce a log of formation porosity as a function of borehole depth.

The circuits shown in FIGS. 2 and 3 are illustrative of the invention. The same objects and features of the invention may be achieved with other known circuit techniques as, for example, digital and digital-analog systems. Thus, the signals from the memorizer and the detector may be stored on tape as a function of borehole depth for subsequent computation as described herein. The specific function former circuit chosen by manipulating the switch 51 in accordance with the formation mineral structure, moreover, may be selected automatically through signals from a lithology logging system of the kind shown and described for example, in U. S. Pat. application Ser. No. 600,504, filed by R. P. Alger on Dec. 9, 1966 for "Combination Sidewall Neutron Porosity and Sonic Tool," now U.S. Pat. No. 3,508,439 issued Dec. 9, 1966 and assigned to the assignee of the invention described herein.

While particular embodiments of the present invention have been shown and described, it is apparent that changes and modifications may be made without departing from this invention in its broader aspects, and, therefore, the aim in the appended claims is to cover all such changes and modifications as fall within the true spirit and scope of this invention.

What is claimed is:

1. A borehole logging tool for deriving a signal related to the porosity of an earth formation comprising, a neutron source for irradiating the formation, a short-spaced neutron detector spaced from said source and adapted to produce a signal in response to the neutron distribution in the formation produced by said source, a long-spaced neutron detector spaced from said source a distance greater than the distance separating said first neutron detector and said source and adapted to produce a signal in response to the neutron distribution in the formation produced by said source, memorizer means coupled to at least one of said detectors for storing signals received therefrom until the logging tool is drawn through the borehole a predetermined distance to produce depth referenced signals corresponding to said short-spaced and long-spaced detector signals referenced to a substantially common depth reference level, and circuit means for combining said depth referenced detector signals to establish an output signal that is related to the porosity of the earth formation.

2. A borehole logging tool according to claim 1 further comprising, measuring means associated with the logging tool for establishing a signal that corresponds to the size of the borehole, means for urging said neutron source and said detectors toward the formation, and function former means responsive to said porosity-related signal and said measuring means signal to produce an output signal that more accurately identifies the formation porosity.

3. A borehole logging tool according to claim 2 wherein said function former means comprises, a plurality of function former circuits each individual to a respective formation mineral composition and a switch for selectively applying said function former circuits to said porosity-related signal in response to the formation mineral composition.

4. A method for measuring the porosity of an earth formation traversed by a borehole comprising the steps of irradiating a formation with neutrons from a neutron source, measuring the distribution of neutrons originated by said source and scattered back from the formation at a first distance relative to the neutron source, measuring the distribution of neutrons originated by said source and scattered back from the earth formation at a different distance relative to the neutron source than said first relative distance, storing at least the sensitive part of the detector. Alternatively, the geometric center of the detector's active volume can be selected as a reference. For the purpose of the illustrative embodiment of the invention described herein, the effective detector center has been chosen for reference.

The effective center is determined experimentally as that point in a radiation detector in which the detection activity in opposite portions of the active volume are of equal magnitude during the same period of time. The effective center of the detector changes somewhat, depending on the radiation pattern established by the relative positions of the source and detector, the physical properties of the earth formation, and the like. A description of the invention in terms, however, of effective centers 38 and 39 for the detectors 26 and 32, respectively, provides a more accurate understanding of the invention.

The long-spaced neutron detector 32 is separated from the detector 26 by a thin washer 31 of ⅛ inch thick neoprene and from the geometric center of the source 25 by about seventeen inches. The detector 32, which is generally similar to the neutron detector 26, also may be a four atmosphere $He^3$ device. As shown in FIG. 2, the detectors 26 and 32 are positioned in an end-to-end abutting relation. The active volume of the long-spaced detector 32 is significantly greater than that of the short-spaced detector 26. Consequently, the detector 32 is relatively more sensitive than the short-spaced detector 26 to the available neutron population in the borehole environment, without regard to neutron energies or other distinguishing characteristics.

For example, in the embodiment shown, the long-spaced detector 32 has a length of 9-¼ inches and a diameter of 2-¾ inches. This detector diameter is substantially coextensive with the corresponding interior diameter of the skid 20. Thus, the detector 32 is as large as the physical limitations of the skid 20 will permit in order to accommodate the largest possible volume of filling gas and thereby provide the maximum neutron sensitivity attainable within the constraints imposed by a reasonable skid diameter. Depending on borehole conditions, it may be advantageous to use skids of larger or smaller diameters than those described herein.

Electrical pulses from the detector 26 caused by reactions between the $He^3$ filling gas and the irradiating neutrons scattered back to the detector from the formation 14 are transmitted to the earth's surface through a conductor 33, a downhole circuit 34 and a conductor 35 in the cable 16. Similarly, pulses from the detector 32 also are transmitted to the earth's surface through a conductor 36, a downhole circuit 37 and a conductor 40 in the cable 16. The transmitted signals from the detectors 26 and 32 are received on the earth's surface by porosity indication circuits 41 of the type that are described in more complete detail, for example, in the aforementioned Locke et al patent application.

Briefly, however, these porosity circuits 41 respond to the transmitted detector signals by combining the signals to establish an output that corresponds to a ratio of the counts registered by the detectors 26 and 32. This ratio signal is a function of the apparent formation porosity for the specific mineral composition under investigation. Accordingly, function former circuits individual to particular minerals, for example, limestone or dolomite, are coupled to the ratio signal to produce an indication of the apparent formation porosity. In this connection, knowledge of the mineral composition can be obtained through other techniques as, for instance, the examination of drill cuttings, core samples, and the like.

This technique for deriving the apparent porosity of the formation under study provides an accurate measure of the true formation porosity if the logging tool is properly calibrated in a test formation beforehand, and if the borehole under investigation is of a uniform diameter. Tool calibration is a technical matter within the control of the logging crew. Uncontrolled changes in the borehole size are an entirely different situation. As hereinbefore mentioned, these changes create significant departures between the apparent and true porosities. These departures, moreover, can be compensated only if the situation is recognized and the magnitude of the change is known.

To improve the quality of the logging tool signal by increasing the vertical resolution of the tool in accordance with one aspect of the invention, a memorizer 42 is coupled to the signals from the long-spaced detector 32. A measuring wheel 43, schematically shown in association with the cable 16, paces the movement of the housing 12 through the borehole 13 by driving a mechanical linkage 44. The linkage 44 controls the signal storage time of the memorizer 42. Typically, the memorizer 42 comprises a magnetic recorder that is regulated through the movement of the wheel 43 and the linkage 44. Other suitable memorizer devices are described in the literature, as for example, U.S. Pat. No. 3,166,709, granted to Henri-Georges Doll on Jan. 19, 1965, for "Method and Apparatus for Providing Improved Vertical Resolution in Induction Well Logging Including Electrical Storage and Delay Means," and U.S. Pat. application Ser. No. 449,362, filed by James H. Moran on Apr. 7, 1965 for "Well Logging With Borehole Effect Compensation and Including Memory Storage of Borehole Measurements, now U.S. Pat. No. 3,405,349 issued Oct. 8, 1968.

The memorizer 42 stores the signal from the long-spaced neutron detector 32 until the effective center of the short-spaced neutron detector 26 traverses a distance d separating the two centers. The stored signal and the as-received signal from the detector 26 then are combined in an apparent porosity circuit 46 to establish a ratio signal that corresponds to the formation porosity in the immediate vicinity of a common measurement point 18 that is opposite the effective center 39 of the detector 32. Thus, the memorizer 42 increases the vertical resolution of the logging system to less than the exemplary eight inch inter-detector distance d shown in FIG. 2.

If, as shown in FIG. 2, a local washout 45 is encountered by a skid 20, physical contact between the neutron source 25 and the formation 14 is disrupted as the skid tips into the cave. This loss of contact disturbs the neutron distribution within the formation 14. Because the signal from the detector 32 is stored until the effective center of the detector 26 has traversed the distance d, both of the signals received by the porosity circuit 46 correspond to the neutron distribution that characterizes the region in the vicinity of the measuring point 18 and do not correspond to some average value for the entire inter-detector distance d. In this situation, the tool response reflects small environmental discontinuone of said neutron distribution measurements, combining said measurements after said storing step to produce a signal that corresponds to the apparent porosity of the formation, measuring the borehole size, and combining said apparent porosity signal with said borehole size measurement in accordance with the formation mineral composition to produce a signal that corresponds to a more accurate formation porosity indication.

5. A borehole logging tool for deriving a signal related to a characteristic of an earth formation comprising, a radioactivity source for irradiating the formation, a short-spaced radioactivity detector spaced from said source and adapted to produce a signal in response to the radioactivity distribution in the formation produced by said source, a long-spaced radioactivity detector spaced from said source a distance greater than the distance separating said first radioactivity detector and said source and adapted to produce a signal in response to the radioactivity distribution in the formation produced by said source, memorizer means coupled to at least one of said detectors for storing signals received therefrom until the logging tool is drawn through the borehole a predetermined distance to produce depth referenced signals corresponding to said short-spaced and long-spaced detector signals referenced to a substantially common depth reference level, and circuit means for combining said depth referenced detector signals to establish an output signal that is related to the characteristic of the earth formation.

6. A borehole logging tool according to claim 5 further comprising, measuring means associated with the logging tool for establishing a signal that corresponds to the size of the borehole, means for urging said radioactivity source and said detectors toward the formation, and function former means responsive to said characteristic related signal and said borehole size signal to produce an output signal that more accurately identifies the formation characteristic.

7. A method for measuring a characteristic of an earth formation traversed by a borehole comprising the steps of irradiating a formation with neclear radiation from a radioactivity source, measuring the distribution of nuclear radiation originated by said source and scattered back from the formation at a first distance relative to the radioactivity source to produce a first signal, measuring the distribution of nuclear radiation originated by said source and scattered back from the earth formation at a different distance relative to the radioactivity source than said first relative distance to produce a second signal, storing at least one of said first or second signals to produce depth referenced first and second signals corresponding to said first and second signals being derived from measurements at substantially the same depth level, combining said depth referenced signals after said storing step to produce a signal that corresponds to said characteristic of the formation.

8. The method of claim 7 and further including measuring the borehole size, and combining said formation characteristic signal with said borehole size measurement in accordance with a predetermined value of the formation mineral composition to produce a signal that corresponds to a more accurate formation characteristic indication.

* * * * *